Figure 1:
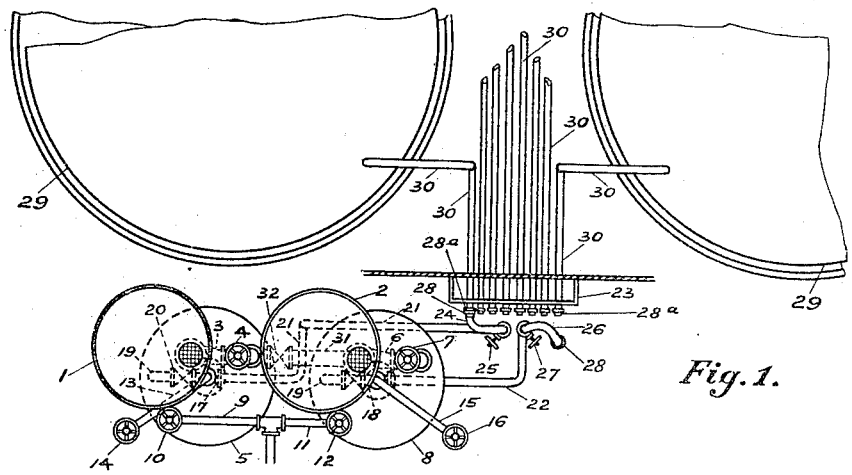

O. BUEDINGER.
WATER PURIFYING APPARATUS.
APPLICATION FILED FEB. 12, 1913.

1,205,154.

Patented Nov. 21, 1916.

Witnesses:
Cecile Markovitz
Ronnie Welsh

Inventor:
Otto Buedinger
By Robt. D. Johnston Jr.
Attorney

UNITED STATES PATENT OFFICE.

OTTO BUEDINGER, OF BIRMINGHAM, ALABAMA.

WATER-PURIFYING APPARATUS.

1,205,154.  Specification of Letters Patent.  Patented Nov. 21, 1916.

Application filed February 12, 1913. Serial No. 747,916.

*To all whom it may concern:*

Be it known that I, OTTO BUEDINGER, a subject of the German Emperor, residing at Birmingham, in the county of Jefferson and State of Alabama, have invented certain new and useful Improvements in Water-Purifying Apparatus, of which the following is a specification.

My invention has for its principal object to perfect the means for distributing chemical solutions utilized in water purification apparatus from the tanks in which the chemical solutions are prepared to the tanks in which the water is treated. Though this is the primary object of my invention, it is generally applicable to distribute to a series of different tanks or different points, different chemical solutions or liquids in exact quantities through a piping system in which air pressure or steam pressure is used to force the chemical solutions or liquids to the intended destination.

In the present practice the charging of chemical solutions, prepared at the ground level, into the high located treating tanks is effected by first preparing the lime milk, the soda solution and the coagulant solution in separate solution tanks. A common pipe line connects these solution tanks to a pressure tank, which is located at a lower elevation than the solution tanks. The pressure tank is connected with a distributing system comprising one or more manifolds from which leads a separate branch pipe to each treating tank. Each of the different branch pipes is provided with a valve, located near the manifold, and opposite the branch pipes there are connected to the manifold smaller branch pipes also provided with valves near the manifold and which are for the purpose of blowing off the manifolds and cleaning the whole distributing system.

The operation of such a system is as follows: A certain amount of lime milk is prepared in the lime milk solution tank. By opening a valve, located in the pipe connection between the lime milk solution tank and the pressure tank, the lime milk is charged into the pressure tank by gravity. When all the lime milk is collected in the pressure tank, compressed air or steam is admitted into the pressure tank and the lime milk is forced by it, out of the pressure tank into the distributing system. By opening one of the valves in a branch pipe the lime milk is then discharged through the branch pipe into its respective treating tank. After the lime milk is delivered to the treating tank, the same process is used successively for charging the soda solution and coagulant solution, when the latter is used. The delivery of the different solutions from the different solution tanks into a certain treating tank is done in rotation and in the same manner the different treating tanks are charged with different solutions in rotation, by successively opening the valves in the several branch pipes of the manifold. In the operation of such a system I have found, that serious disadvantages result, which affect not only the uniform purification of the water to be treated in the several treating tanks, but also the life and operation of the apparatus itself. The disadvantages which affect the life and operation of the apparatus are attributable to the precipitation and accumulation of chemicals in the distributing system, especially in the piping, the manifolds, and the bottom of the pressure tank. When the lime milk is delivered from the pressure tank into the distributing system and from there through a branch pipe into a treating tank by means of compressed air or live steam, the medium, *i. e.*, compressed air or live steam, forces the solution, as a whole, ahead of it through the pressure tank, manifold and piping, the medium acting like a piston. A portion of lime milk will be forced into the other branch pipes of the manifold, not in use, up to the closed valves therein, and it will also fill the body of the manifold beyond the branch pipe, which is open, and it will accumulate in the blow off pipes. In other words the lime milk will fill and remain in such parts as long as pressure is on, while the balance of the lime milk is discharged through the open branch pipe into a treating tank. As soon as the pressure is relieved, the lime milk, thus left in part of the manifold, the branch- and blow off pipes, will collect in the main body of the manifold and remain there until the next charge is made from the pressure tank. This next charge will be composed of the soda solution and it will mix with the lime milk left in the manifold and be forced with it into the treating tank, where the water is already under treatment. A part of the soda solution will in turn and in the same way be left in the manifold.

after the pressure is cut off, and will mingle with the succeeding chemical solution charged. This commingling of the chemicals in the piping and manifolds and in the bottom of the pressure tank causes a precipitation which gradually chokes the piping and fills up the bottom of the pressure tank, thereby delaying the expeditious operation of the apparatus and shortening its life. The most serious defect, however, in such systems is due to the fact that it is practically impossible to deliver an exact and uniform charge of chemicals to the different treating tanks, which is essential to the successful operation of the apparatus as a whole.

Every part of a charge of lime milk, soda solution, or coagulant solution left in the distributing system has necessarily failed to reach the treating tank for which it was intended, and that treating tank has therefore been undercharged. Further the quantity of chemical solutions which will be left in the manifold varies in accordance with the position, relative to the inlet, of each branch pipe used. In other words, when the branch pipe nearest the inlet end of the manifold is opened to deliver a charge of chemical solution to its respective tank all that part of the manifold beyond it and the space in all the other branch pipes and blow off pipes up to the valves therein, will be filled with the chemical solution, representing a condition in which the greatest dead space exists in the distributing system, the filling of which causes the maximum chemical loss; while, when the branch pipe farthest from the inlet end of the manifold is opened, a condition of minimum loss exists since there will be the least dead space and accordingly the minimum reserve of chemical solution in the manifold. These objectionable conditions have made necessary the provision of means whereby the chemical solutions in exact predetermined quantities can each time be delivered to the desired treating tank and whereby no commingling of the chemical solutions in the distributing system can occur at any time. With these ends in view, I have provided, as my preferred means, a separate pressure tank for each chemical solution used and I utilize a separate delivery pipe for each pressure tank which leads therefrom to what I term a distribution board where each delivery pipe is provided with an adjustable end which may be connected with any one of a series of separate pipes, each of which, like a branch pipe of the old system, leads to a different treating tank. With this equipment, the chemical solutions may be delivered directly from their respective pressure tanks through the adjustable pipe connections to any desired treating tank. As a result, each pressure tank is adapted to be connected up with the treating tank it is charging, by a continuous pipe without recesses or dead spaces to collect the chemical solutions and therefore the compressed air or steam will force all the chemical solution ahead of it through the pipe and deliver the whole quantity thereof into the treating tank for which the charge is intended. I obtain from this arrangement a maximum life for the distributing system and an exact, uniform and rapid delivery of the chemical solutions to the several treating tanks.

To make my apparatus flexible, I arrange pipe connections so that any pressure tank may receive chemical solution from any one of the chemical solution tanks, and to simplify the operation I bring all parts requiring the constant attention of the operator, into convenient reach from a single operating floor.

The principles embodied in this apparatus for the handling and distributing of water treating chemicals are applicable to various other uses and purposes, and are illustrated in their preferred embodiment in the accompanying drawings, in which:—

Figure 2:
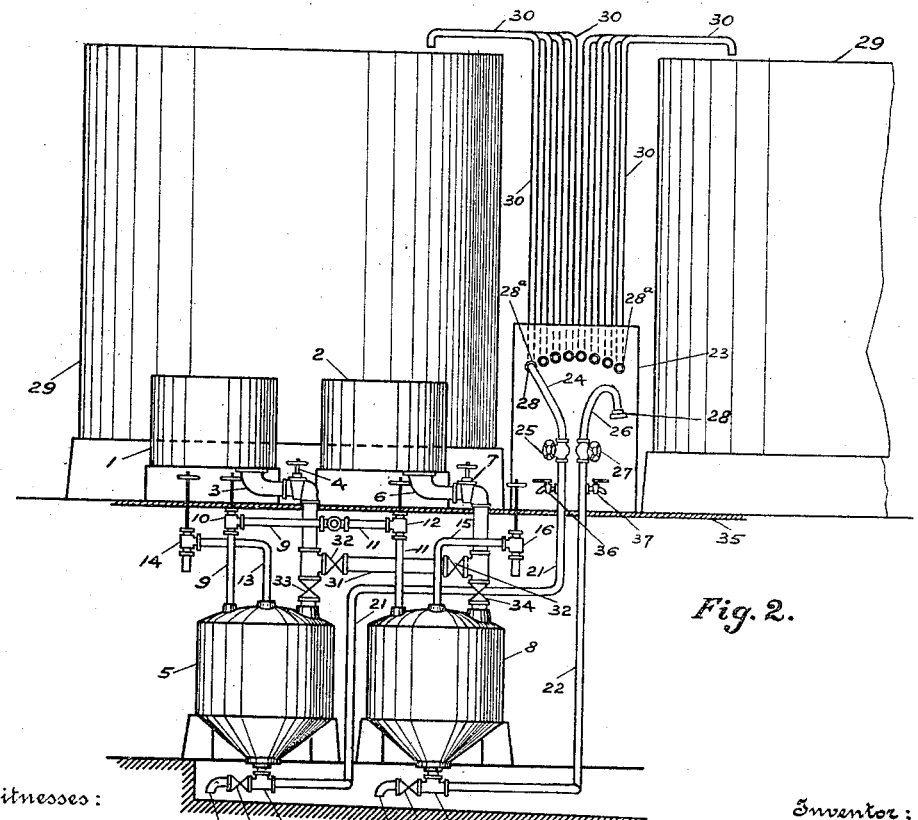

Figure 1 is a top plan view of my distributing apparatus; only parts of two treating tanks are shown, which are representing the first row of a number of treating tanks. Fig. 2 is a front elevation of Fig. 1.

Similar reference numerals refer to similar parts throughout the drawings.

In the illustrative embodiment of my invention shown in the drawings, I prepare the lime milk in solution tank 1. Suitable piping 3 serves to conduct the lime milk from solution tank 1, under the control of a valve 4, into a pressure tank 5. I prepare the soda solution in solution tank 2 and in like manner the soda solution will flow through piping 6, under control of valve 7, into a pressure tank 8. Compressed air or steam is adapted to be admitted to the pressure tank 5 through a pipe 9 under the control of a valve 10, and to the tank 8 through a pipe 11 under the control of a valve 12. The pressure tank 5 has connected to its top a relief pipe 13 having therein a valve 14. The tank 8 is provided with a similar relief pipe 15 with a valve 16. The lower ends of each tank are provided with a conical bottom which converges to a central bottom discharge opening in which is inserted a T-fitting 17 for the tank 5 and T-fitting 18 for the tank 8. Each of these fittings has one branch thereof connected to a blow out pipe 19 having a valve 20 therein. The other branch of the fitting 17 is connected with a chemical delivery pipe 21 and the fitting 18 is similarly connected with a delivery pipe 22. These pipes 21 and 22 are provided with suitable elbows and lead to what I term a distribution board 23. A flexible hose 24 is connected to a valve 25 on the discharge end of pipe 21, and a similar hose 26 is connected to a valve 27 on the discharge end of pipe 22. At its free end, each hose is provided with a suitable coupling section 28.

Any desired number of water treating tanks 29 may be used, but only two are shown formally for purposes of illustration. These are adapted to be supplied with chemical solutions by a separate pipe 30 which leads from the distribution board 23. The inlet ends of these several pipes 30 are arranged at the top of the board 23 and project therethrough, being disposed in such position relative to the discharge ends of pipes 21 and 22 that either hose 24 or 26 may be coupled up with any one of the pipes 30. Each pipe 30 leads without branches or manifolds direct to its respective treating tank 29 and is adapted to deliver the chemical only to that tank. Preferably the inlet ends of pipes 30 are provided with a coupling section 28$^a$ adapted to connect with the coupling section 28.

In the event either one of the solution tanks 1 or 2, or one of the pressure tanks 5 or 8 must undergo repairs, I provide a bypass by means of which either the other solution tank or the other pressure tank may be temporarily utilized to deliver both chemicals to the treating tanks. This arrangement comprises a pipe 31 which has valves 32 near its ends which are connected with the pipes 3 and 6. These latter pipes below the point of connection therewith of the pipe 31, are provided with valves 33 and 34 respectively. By closing valve 33 in the pipe 3 and opening both valves 32 and valve 34 in pipe 6, the chemical solution from tank 1 may be charged into pressure tank 8 and distributed to any one of the treating tanks, and by a similar manipulation of the valves the solution tank 2 may deliver the soda solution to either pressure tank 5 or 8 for distribution. In fact the piping system is so arranged that any solution tank may discharge into any pressure tank. To facilitate the operation of my apparatus I so arrange the parts that those requiring attention are all within reach of an operator on the operating floor 35; thus the distributing board 23 is disposed adjacent to the tanks 1 and 2 in which the operator prepares the chemical solutions, and I extend the operating stems of the valves in general use in the piping above the floor 35 where they can be conveniently operated without requiring the operator to leave the floor. To enable the operator to determine when all of a given charge of chemical solution has been delivered to a treating tank, I provide pipes 21 and 22 above floor 35 with pet cocks 36 and 37 respectively, and if these, on being opened, discharge air or steam, this indicates that the whole quantity of chemical solution has been removed from the tank 5 or 8 and delivered to the distributing pipes 30 that for the time being are connected up to the pressure tanks. The blast of air or pressure medium acting like a plunger evacuates both the pressure tank and the pipe line connected therewith and, there being no dead spaces left in the pipe lines, the rush of the pressure medium or the air plunger will drive all of the chemical solution ahead of it from the pressure tank and through the piping. The rush of the pressure medium will not only drive all of the chemical before it but it will serve the desirable purpose of cleaning the pipes, but if dead spaces formed by branch pipes, manifolds, etc., are included in the pipe line, this evacuating and cleaning action of the blast will not wholly obtain and the objectionable conditions heretofore pointed out in connection with chemical distributing systems will occur.

In general operation, assuming all the valves are closed, the valve 33 is opened and, when it is desired to charge the lime milk, the valve 4 is opened so that the lime milk, as prepared in solution tank 1, will run into pressure tank 5. If now the valves 10 and 25 be opened and valve 4 closed, compressed air will enter pressure tank 5 and force the lime milk therefrom through pipe 21 and hose 24 to the pipe 30 with which the hose is coupled, and through this pipe to its respective tank 29. As soon as tank 5 has been thus emptied, which can be observed by opening pet cock 36 valves 10 and 25 are closed and the valve 14 is opened to relieve the pressure in the tank which is then ready to receive another charge. The soda solution will be charged in the same manner from the pressure tank 8 and through the distribution board to any one of the treating tanks. When it is desired to blow out the pressure tanks, air pressure is admitted to the pressure tanks and valves 20 are opened. Obviously there will be no chemical reserve in the pipes, and there will be no commingling of the chemicals in the distribution system which will therefore not become clogged, thus enabling me to quickly charge exact quantities to all of the tanks and get the maximum life out of the apparatus as a whole. Obviously my invention is adapted to charge any chemical solution of liquids to tanks or receptacles other than water treating tanks by using any medium as pressure for forcing the liquid, to be distributed, ahead of it to its destination.

Having thus described my invention, what I claim as new and desire to secure by Letters Patent, is:—

1. In a water distributing apparatus, two overhead tanks for the preparation of different chemicals, two pressure tanks, a valve controlled discharge pipe leading from each overhead tank to a pressure tank, a by-pass between said pipes, valves interposed in said pipes below said by-pass, means to admit fluid pressure to said pressure tanks which have conical bottoms having discharge openings, a valve controlled blow-off pipe leading from each pressure tank, valve controlled chemical discharge pipes leading from said discharge openings, a series of separate disconnected distributing pipes leading to separate points of use for the chemical, and means to directly connect each of said discharge pipes with any one of said distributing pipes and disconnect it from all the others, substantially as described.

2. In a chemical distribution mechanism for water purifying apparatus, a plurality of separate water treatment tanks, an independent pipe line leading from a common point into each tank, said pipes being of uniform diameter and having their inlet ends juxtaposed, a plurality of chemical solution tanks, means to apply pressure to the chemical solution in said tanks, a separate valve controlled discharge pipe leading from each tank to a point adjacent to the inlet ends of said first mentioned pipes, and an adjustable pipe connection forming a direct continuation of substantially uniform diameter with each solution pipe and being adapted to connect with any one of said first mentioned pipes at a time, the connected pipe line or lines thus established being continuous and free of dead air spaces.

3. In a chemical distribution mechanism for water purifying apparatus, a plurality of separate water treatment tanks, an independent pipe line leading from a common point into each tank, said pipes being of uniform diameter and having their inlet ends juxtaposed, a plurality of chemical solution tanks, means to apply pressure to the chemical solution in said tanks, a separate valve controlled discharge pipe leading from each tank to a point adjacent to the inlet ends of said first mentioned pipes, and an adjustable pipe connection forming a direct continuation of substantially uniform diameter with each solution pipe and being adapted to connect with any one of said first mentioned pipes at a time, the connected pipe line or lines thus established being continuous and of uniform diameter and free of dead air spaces.

4. In a chemical distribution mechanism for water purifying apparatus, a plurality of water treatment tanks, a separate pipe line to each tank, a chemical solution tank, means to admit air pressure to said tank, a chemical discharge pipe leading from the bottom of the tank to a point adjacent to the inlet ends of said pipes leading to the treatment tanks, said chemical distribution pipe having a flexible portion of uniform diameter therewith and with the pipes leading to the water treatment tanks, said flexible portion being adapted to connect the chemical delivery pipe with any one of the pipes leading to the water treatment tanks to form a continuous uniform pipe line free of dead air spaces.

In testimony whereof I affix my signature in presence of two witnesses.

OTTO BUEDINGER.

Witnesses:
 NOMIE WELSH,
 R. D. JOHNSTON, Jr.

Copies of this patent may be obtained for five cents each, by addressing the "Commissioner of Patents, Washington, D. C."